(12) United States Patent
Min (10) Patent No.: US 9,977,504 B2
(45) Date of Patent: May 22, 2018

(54) METHOD AND APPARATUS FOR OPERATING ADDITIONAL FUNCTION IN MOBILE DEVICE

(71) Applicant: Samsung Electronics Co. Ltd., Suwon-si, Gyeonggi-do (KR)

(72) Inventor: Sunyoung Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/921,974

(22) Filed: Jun. 19, 2013

(65) Prior Publication Data
US 2014/0013285 A1 Jan. 9, 2014

(30) Foreign Application Priority Data

Jul. 9, 2012 (KR) .................. 10-2012-0074710

(51) Int. Cl.
*G06F 3/0488* (2013.01)
*G06F 3/01* (2006.01)

(52) U.S. Cl.
CPC ............ *G06F 3/017* (2013.01); *G06F 3/0488* (2013.01); *G06F 2203/04808* (2013.01)

(58) Field of Classification Search
CPC .......... G06F 3/033; G06F 3/048; G06F 15/00; G06F 3/017; G06F 17/30126; G06F 17/30014; G06F 3/0483
USPC ................. 715/863, 835, 728, 707; 358/1.9; 717/168, 178
See application file for complete search history.

(56) References Cited

U.S. PATENT DOCUMENTS

| 5,806,079 A * | 9/1998 | Rivette .............. G06F 17/30014 707/E17.008 |
| 6,110,228 A * | 8/2000 | Albright et al. .............. 717/178 |
| 7,581,181 B2 * | 8/2009 | White .......................... 715/707 |
| 2003/0154250 A1* | 8/2003 | Miyashita ............. H04L 12/581 709/204 |
| 2008/0046518 A1* | 2/2008 | Tonnison ............. G06Q 10/107 709/206 |
| 2008/0104547 A1* | 5/2008 | Morita et al. ................. 715/863 |
| 2008/0174570 A1 | 7/2008 | Jobs et al. |
| 2008/0320462 A1* | 12/2008 | Bergman et al. ............. 717/168 |

(Continued)

FOREIGN PATENT DOCUMENTS

| CN | 101866261 A | 10/2010 |
| EP | 1 462 921 A2 | 9/2004 |

(Continued)

*Primary Examiner* — Jennifer To
*Assistant Examiner* — Jasmine Wan
(74) *Attorney, Agent, or Firm* — Jefferson IP Law, LLP (57) ABSTRACT

A method and apparatus for easily operating an additional function associated with an application are provided in a mobile device. In the method, the apparatus detects a gesture inputted while a specific application is running, and invokes an additional function corresponding to the detected gesture. Also, the apparatus displays an execution screen that contains at least one link item for offering a connection with the specific application. Furthermore, when a signal for selecting the link item is inputted, the apparatus applies an execution result of the additional function to the specific application. The inventive method and apparatus thus enhance a user's convenience.

12 Claims, 4 Drawing Sheets

(56) References Cited

U.S. PATENT DOCUMENTS

| | | | |
|---|---|---|---|
| 2009/0199130 A1* | 8/2009 | Tsern | G04G 21/08 715/810 |
| 2009/0320141 A1* | 12/2009 | Wang et al. | 726/27 |
| 2010/0063813 A1* | 3/2010 | Richter et al. | 704/231 |
| 2010/0100821 A1* | 4/2010 | Tsai et al. | 715/728 |
| 2010/0128291 A1* | 5/2010 | Vendrow et al. | 358/1.9 |
| 2010/0251189 A1* | 9/2010 | Jaeger | 715/863 |
| 2010/0257447 A1 | 10/2010 | Kim et al. | |
| 2012/0032877 A1* | 2/2012 | Watkins et al. | 345/156 |
| 2012/0064947 A1* | 3/2012 | Yi | G06F 3/0483 455/566 |
| 2012/0084644 A1* | 4/2012 | Robert | G06F 17/30126 715/255 |
| 2013/0007653 A1* | 1/2013 | Stolyarov et al. | 715/784 |
| 2013/0050141 A1* | 2/2013 | Park | G06F 3/0488 345/174 |
| 2013/0117715 A1* | 5/2013 | Williams et al. | 715/835 |
| 2013/0174100 A1* | 7/2013 | Seymour et al. | 715/863 |
| 2013/0326582 A1* | 12/2013 | Kruzeniski | G06F 21/6209 726/2 |
| 2014/0223381 A1* | 8/2014 | Huang et al. | 715/863 |

FOREIGN PATENT DOCUMENTS

| | | |
|---|---|---|
| EP | 2 234 379 A1 | 9/2010 |
| WO | 2010/065168 A1 | 6/2010 |

\* cited by examiner

METHOD AND APPARATUS FOR OPERATING ADDITIONAL FUNCTION IN MOBILE DEVICE

PRIORITY

This application claims the benefit under 35 U.S.C. § 119(a) of a Korean patent application filed on Jul. 9, 2012 in the Korean Intellectual Property Office and assigned Serial No. 10-2012-0074710, the entire disclosure of which is hereby incorporated by reference.

BACKGROUND OF THE INVENTION

1. Field of the Invention

The present invention relates to a mobile device. More particularly, the present invention relates to a method and apparatus for easily operating an additional function associated with an application in a mobile device.

2. Description of the Related Art

Based on the remarkable growth of mobile technologies, there are a great variety of mobile devices available to consumers and mobile devices are becoming increasingly popular. A mobile device is now able to provide many functions that are helpful to users, such as, for example, a call function, a camera or camcorder function, a broadcasting reception function, an Internet access function, and the like.

When offering a certain function, a mobile device also provides additional functions associated with the function rather than simply offering the function only. For example, a text message service function also provides a function of appending photo, video, audio, and voice recording files thereto. Such a mobile device, however, requires several steps in order to invoke an additional function while an application is running. For example, in a case of desiring to invoke a memo function in a text message writing page, a user must select a menu key in the page and then select a memo function in a list of additional functions displayed in response to a selection of the menu key. Moreover, methods of invoking additional functions are different according to the types of applications. For example, depending on a running application, a mobile device outputs an additional function list in response to a menu key input, a long touch input, or a special function key input. Such different, application-dependent methods of invoking additional functions may deteriorate a user's convenience.

Accordingly, there is a need for a method and apparatus for operating additional functions in a mobile device so as to quickly and easily invoke a specific additional function associated with a running application.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and apparatus for operating additional functions in a mobile device so as to quickly and easily invoke a specific additional function associated with a running application through a gesture input.

Another aspect of the present invention is to provide a method and apparatus for operating additional functions in a mobile device so as to display, on a part of an execution screen of an additional function, a link item for offering a connection with a running application.

Another aspect of the present invention is to provide a method and apparatus for operating additional functions in a mobile device so as to dynamically vary a link item displayed on an execution screen of an additional function according to the status of a running application.

In accordance with an aspect of the present invention, a method for operating an additional function in a mobile device is provided. The method includes detecting a gesture inputted while a specific application is running, and invoking an additional function corresponding to the detected gesture.

In accordance with another aspect of the present invention, an apparatus for operating an additional function in a mobile device is provided. The apparatus includes a touch screen configured to output a screen and to receive an input of a gesture, and a control unit configured, when the input of the gesture is detected while a specific application is running, to invoke an additional function corresponding to the detected gesture and to control the touch screen to output an execution screen of the additional function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
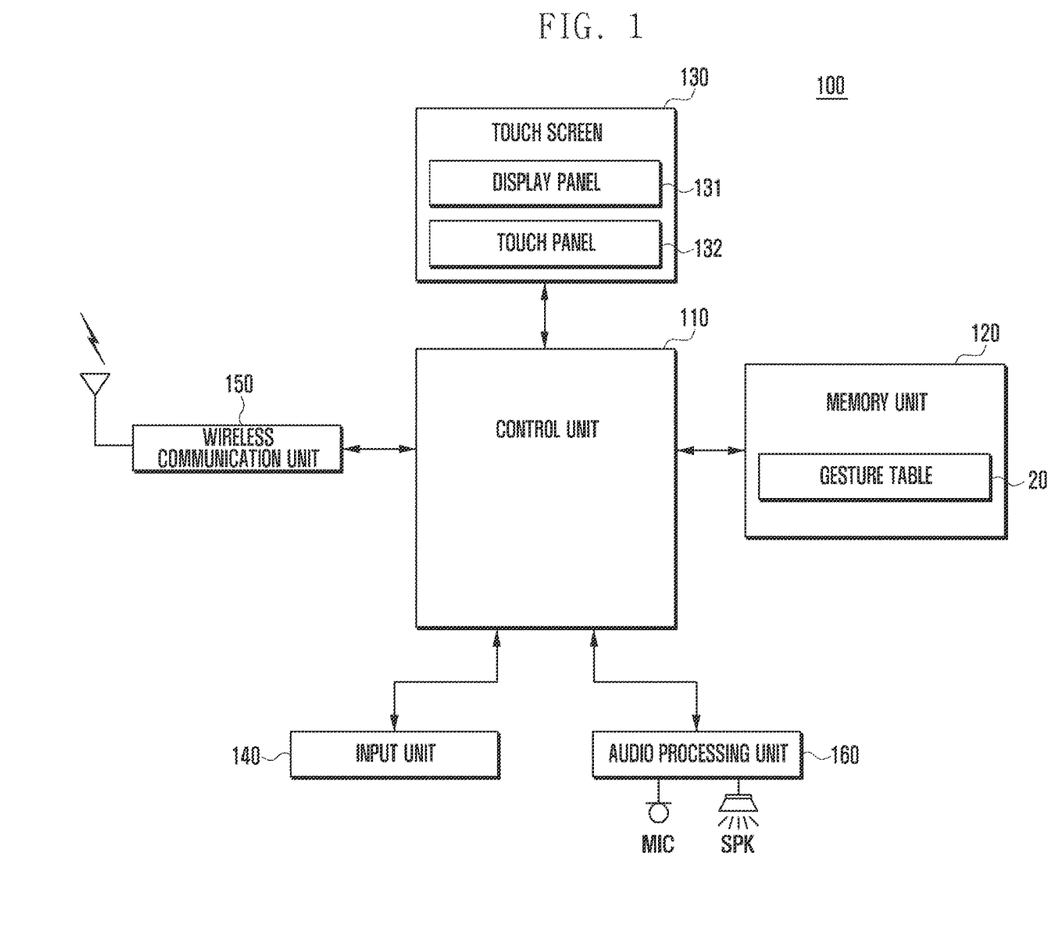
FIG. 1 is a block diagram illustrating a configuration of a mobile device according to an exemplary embodiment of the present invention.

FIG. 1 is a block diagram illustrating a configuration of a mobile device according to an exemplary embodiment of the present invention.

Referring to FIG. 1, a mobile device 100 may include, but is not limited to, an audio processing unit 160, a wireless communication unit 150, an input unit 140, a touch screen 130, a memory unit 120, and a control unit 110. The touch screen 130 may include a display panel 131 and a touch panel 132.

The wireless communication unit 150 supports a communication function of the mobile device 100 and, if the mobile device 100 supports a mobile communication function, may be composed of a mobile communication module. The wireless communication unit 150 may include a Radio Frequency (RF) transmitter that up-converts the frequency of an outgoing signal and then amplifies the signal, an RF receiver that amplifies with low-noise an incoming signal and down-converts the frequency of the signal, and the like.

The audio processing unit 160 may output various audio data configured during the operation of the mobile device 100, audio data associated with a replay of an audio file stored in the memory unit 120, audio data received from the outside, and the like. Also, the audio processing unit 160 may support a function to collect audio data. For these purposes, the audio processing unit 160 may have a speaker (SPK) and a microphone (MIC). For example, the audio processing unit 160 may convert analog audio signals received from the microphone into digital audio signals, or convert digital audio signals received from the control unit 110 into analog audio signals and then output them through the speaker. More particularly, in an exemplary embodiment of this invention, the audio processing unit 160 may activate the microphone and collect audio data received through the microphone in response to a request for a voice recording when a text message is written. Such collected audio data may be appended to the text message and then transmitted to a mobile device of a recipient.

The input unit 140 may include a plurality of input keys and function keys to receive numeric or alphabetic information and to set up various functions. The function keys may have navigation keys, side keys, shortcut keys, and any other special keys defined to perform particular functions. Additionally, the input unit 140 creates key signals associated with user setting and function control of the mobile device 100, and then delivers them to the control unit 110. The input unit 140 may be formed of one or a combination of input tools such as a QWERTY keypad, a 3*4 keypad, a 4*3 keypad, a ball joystick, an optical joystick, a wheel key, a touch key, a touch pad, and a touch screen. If the mobile device 100 supports a full screen, the input unit 140 may include only a volume key for volume adjustment and function keys for various functions such as screen on/off and power on/off, which are formed on a lateral side of a case of the mobile device 100. In an exemplary implementation, the input unit 140 may create various input signals such as an input signal for invoking an application, an input signal for invoking an additional function associated with a running application, or an input signal for applying an execution result of an additional function to a running application, and then deliver them to the control unit 110.

The touch screen 130 may perform both an input function and a display function. For this, the touch screen 130 may include the display panel 131 and the touch panel 132.

The display panel 131 displays information inputted by or for viewing by a user, including menus of the mobile device 100. Namely, the display panel 131 may offer (i.e., display) various screens during use of the mobile device 100, such as a home screen, a menu screen, a message writing screen, a phonebook screen, a webpage output screen, and the like. This display panel 131 may be formed of a Liquid Crystal Display (LCD), Organic Light Emitting Diodes (OLED), or any other equivalent. In an exemplary embodiment, the display panel 131 may offer, under the control of the control unit 110, an execution screen of an application, an execution screen of an additional function associated with a running application, a screen of an application to which an execution result of an additional function is applied, and the like. In such cases, the display panel 131 may output an execution screen of an additional function in the form of a pop-up window. Various screen interfaces displayed on the display panel 131 will be described below.

The touch panel 132 is attached to the front of the display unit 131. The touch panel 132 may create a touch event in response to a touch of any touch input tool (e.g., user's finger, stylus pen, etc.) and send the touch event to the control unit 110. More specifically, the touch panel 132 may recognize a touch based on a change in a physical quantity (e.g., capacitance, resistance, etc.) caused by a touch of a touch input tool and deliver a corresponding signal to the control unit 110 to determine a touch position and a touch type (i.e., a touch, a touch release, a tap, a double tap, a multi touch, a touch movement such as a drag, a flick, or a sweep, etc.). Since the touch panel 132 is well known in the art, a detailed description will be omitted herein. More particularly, in this invention, the touch panel 132 may send various touch signals inputted for operating an additional function of the mobile device 100 to the control unit 110. This touch signal may include a signal for invoking an application, a signal for invoking an additional function associated with a running application, a signal for applying an execution result of an additional function to a running application, and the like.

The memory unit 120 may store an Operating System (OS) of the mobile device 100, various applications required for optional functions such as a sound play function, an image or video view function, and a broadcasting play function, user data, data transmitted or received during communication, and the like. For example, the memory unit 120 may store contents such as video files, game files, music files, movie files, and the like. In an exemplary embodiment, the memory unit 120 may store a gesture table 20 that defines a correspondence between a gesture signal and an additional function. The gesture table 20 may be organized as shown in Table 1 below.

TABLE 1

| Gesture | Additional function | Gesture | Additional function |
|---|---|---|---|
| ← | Memo | ↴ | Voice recording |
| → | Image capture | ↳ | Phonebook |
| Double tap | Gallery | ↙ | Video recording |
| ... | ... | ... | ... |

Referring to Table 1, a left moving gesture "←" corresponds to a memo function, a right moving gesture "→" corresponds to an image capture function, and a double tap gesture corresponds to a gallery function. Additionally, a right and down moving gesture " ↴ " corresponds to a voice recording function, a down and right moving gesture " ↳ " corresponds to a phonebook function, and a down and left moving gesture " ↙ " corresponds to a video recording function. However, Table 1 is exemplary only and not to be considered as a limitation of this invention. Namely, such correspondence between gestures and additional functions may be defined according to a designer's intention and may also be varied by a user. This gesture table 20 may be equally applied regardless of the type of a running application. Namely, a user can trigger a desired additional function through the same gesture regardless of the type and status of a running application. This greatly enhances the user's convenience.

Additionally, the memory unit 120 may store an additional function operating program for controlling the operation of an additional function in the mobile device 100. The additional function operating program may contain a routine for detecting an input of a gesture and identifying the type of the detected gesture while a specific application is running, a routine for searching the gesture table 20 to determine whether there is a gesture having the identified type and for invoking an additional function corresponding to the gesture having the identified type or for treating the detected gesture as an error if there is no gesture having the identified type, a routine for determining a name, an icon, or a status of the specific application and for displaying them on an execution screen of the additional function, a routine for applying an execution result of the additional function corresponding to the gesture to the specific application, and the like.

The control unit 110 may control operations of the mobile device 100, control signal flows between internal blocks of the mobile device 100, and perform a data processing function. This control unit 110 may be Central Processing Unit (CPU), an Application Processor (AP), and the like. In an exemplary embodiment, when any predefined gesture input is detected while a specific application is running, the control unit 110 may control an invocation of an additional function corresponding to the detected gesture. More specifically, the control unit 110 may identify the type of the detected gesture and search the gesture table 20 to determine whether there is a gesture having the identified type. If there is a gesture having the identified type in the gesture table 20, the control unit 110 may control an invocation of the corresponding additional function. If there is no gesture having the identified type in the gesture table 20, the control unit 110 may treat the detected gesture as an error. This processing may be outputting an error message, an error alert sound, and the like. Meanwhile, if the error occurs more than a predetermined number of times, the control unit 110 may output a list of available gestures.

When invoking an additional function, the control unit 110 may control a display of a link item having a function to connect with a specific application on a part of a screen of an additional function. For this, the control unit 110 may analyze a name, an icon, a status, and the like of the specific application. According to results of the analysis, the control unit 110 may vary the link item displayed on the screen of the additional function. Namely, the link item displayed on an execution screen of the additional function may be varied depending on the type and status of the specific application.

Thereafter, the control unit 110 may control the execution of the additional function and, when a signal for selecting the link item is inputted, apply an execution result of the additional function to the specific application. For example, if a memo function is invoked during the writing of a text message, the control unit 110 may process the input of a user's memo on a memo screen and, when a selection signal for the link item (i.e., a text message icon) is inputted, insert the memo input into the text message.

Although not shown in FIG. 1, the mobile device 100 may further and selectively include various elements having additional functions, such as a Global Positioning System (GPS) module for receiving location information, a broadcasting reception module for receiving broadcasting, a digital sound play module such as an MP3 module, an Internet communication module for performing Internet functions, a motion sensor module for detecting the movement of the mobile device 100, and the like. According to a digital convergence tendency, such elements may be varied, modified and improved in various ways, and any other elements equivalent to the above elements may be additionally or alternatively equipped in the mobile device 100.

Figure 2:
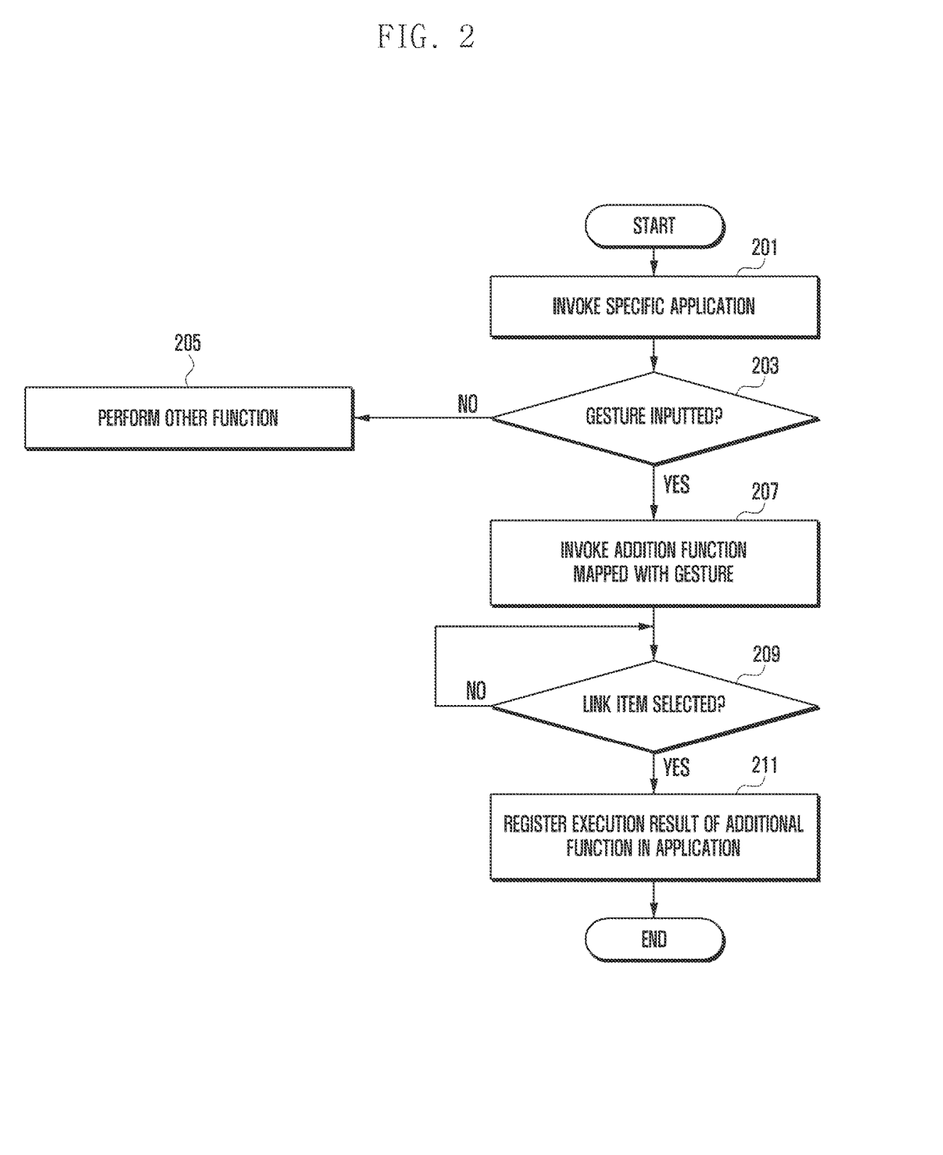
FIG. 2 is a flow diagram illustrating a method for operating an additional function in a mobile device according to an exemplary embodiment of the present invention.

FIG. 2 is a flow diagram illustrating a method for operating an additional function of a mobile device according to an exemplary embodiment of the present invention.

Referring to FIG. 2, the control unit 110 of the mobile device 100 may invoke a specific application at a user's request in step 201. In step 203, the control unit 110 may determine whether a gesture is inputted. In an exemplary implementation, a gesture may be inputted through the touch screen 130.

If no gesture is inputted, the control unit 110 may perform any other function in step 205. For example, the control unit 110 may control the operation of a specific application in response to an input signal, or terminate a specific application and enter into an idle state in response to an input of a closing signal. On the contrary, if it is determined in step 203 that a gesture is inputted, the control unit 110 may invoke a specific additional function corresponding to the gesture input in step 207. More specifically, the control unit 110 may identify the type of the inputted gesture and search the gesture table 20 stored in the memory unit 120 to find an additional function corresponding to the identified type of gesture input.

Furthermore, the control unit 110 may control a display of a link item, on a part of an execution screen of an additional function, which offers a connection with a running application. This link item may be displayed in the form of an icon of a running application or in the form of a text box corresponding to the name of a running application. However, a display form of the link item is not limited to an icon or a text box.

In step 209, the control unit 110 may determine whether the link item is selected (i.e., touched). If the link item is not selected, the control unit 110 may maintain step 209. On the contrary, if the link is selected, the control unit 110 may register an execution result of an additional function in the connected application in step 211. For example, a user may select a memo function while a calendar application is running, input a memo, and automatically register the inputted memo in a calendar by touching a link item displayed on a memo screen. In this case, the control unit 110 may capture the memo, save a capture image, or save text data only by extracting the text data. As another example, a user may select a memo function while he or she writes a text message, input a memo, and automatically register the inputted memo in the text message by touching a link item displayed on a memo screen. In this case, the memo may be registered in the form of an appended file, or a capture image of the memo may be inserted into the text message.

In an exemplary implementation, one or more link items may be used depending on the status of a running application. For example, when a memo function is invoked while a schedule program is running, the control unit 110 may display, on a part of a memo screen, a name link item for registering a memo input in an event name section, a location link item for registering a memo input in an event location section, a description link item for registering a memo input in a description section, and the like.

As discussed above, exemplary embodiments of the present invention may easily invoke an additional function through a gesture while an application is running. Also, this invention may display a link item on an execution screen of the additional function invoked through a gesture, and simply register an execution result of the additional function in a connected application through a touch input on the link item.

Figure 3:
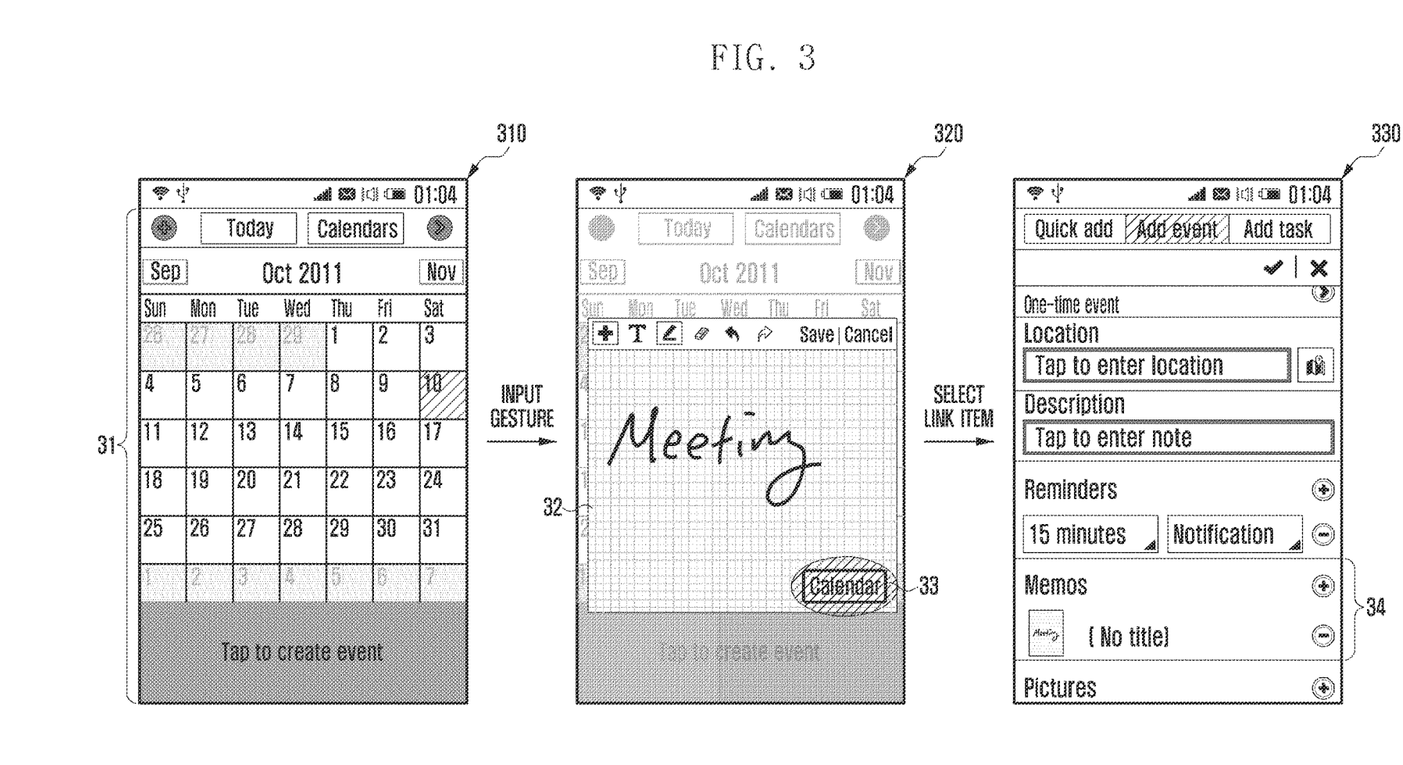
FIG. 3 shows a screen interface illustrating a method for operating an additional function in a mobile device according to an exemplary embodiment of the present invention.

FIG. 3 shows a screen interface illustrating a method for operating an additional function in a mobile device according to an exemplary embodiment of the present invention.

Referring to FIGS. 1 to 3, the control unit 110 may invoke a specific application at a user's request and output an execution screen of the application on the touch screen 130. For example, as shown in a screenshot 310, the control unit 110 may display a calendar screen 31 on the touch screen 130.

The control unit 110 may detect a gesture input that requests an invocation of an additional function. The control unit 110 may identify the type of the detected gesture and search the gesture table 20 as shown in Table 1 so as to find a function corresponding to the identified type of gesture. For example, if a left moving gesture for activating a memo function is inputted, the control unit 110 may output a memo screen 32 as shown in a screenshot 320. In this case, the memo screen 32 may contain a link item 33. A user may input a memo "Meeting" with handwriting on the memo screen 32. Also, a user may freely input such a memo by using various function icons or buttons of the memo screen 32 (e.g., writing tool selection, color change, eraser, previous (backward), next, save, etc.).

When the link item 33 is selected, the control unit 110 may terminate a memo function and register the memo input "Meeting" in a memo section 34 in an event registration screen (i.e., add event) as shown in a screenshot 330. More specifically, the control unit 110 may capture the memo screen 32 and register a capture image in the memo section 34. In this case, the event registration screen is that of a date selected in the calendar screen (e.g., a highlighted date October 10 in the screenshot 310).

Even though the memo screen 32 is displayed in the form of a pop-up window in the screenshot 320, this is merely for example and the present invention is not limited thereto.

Alternatively, the control unit 110 may control the memo screen 32 to be displayed in the form of a full screen.

Additionally, even though it is shown that the memo screen contains a single link item this is merely for example and the present invention is not limited thereto. That is, the memo screen may contain a number of link items associated with a calendar function. More specifically, the memo screen may contain many icons, each of which corresponds to a section for allowing a registration of the memo input. For example, the memo screen may contain link items respectively corresponding to name, location and description sections among event registration sections. The control unit 110 may register the memo input in an event name section in response to a selection of a name link item on the memo screen, register the memo input in an event location section in response to a selection of a location link item, and register the memo input in a description section in response to a selection of a description link item.

Figure 4:
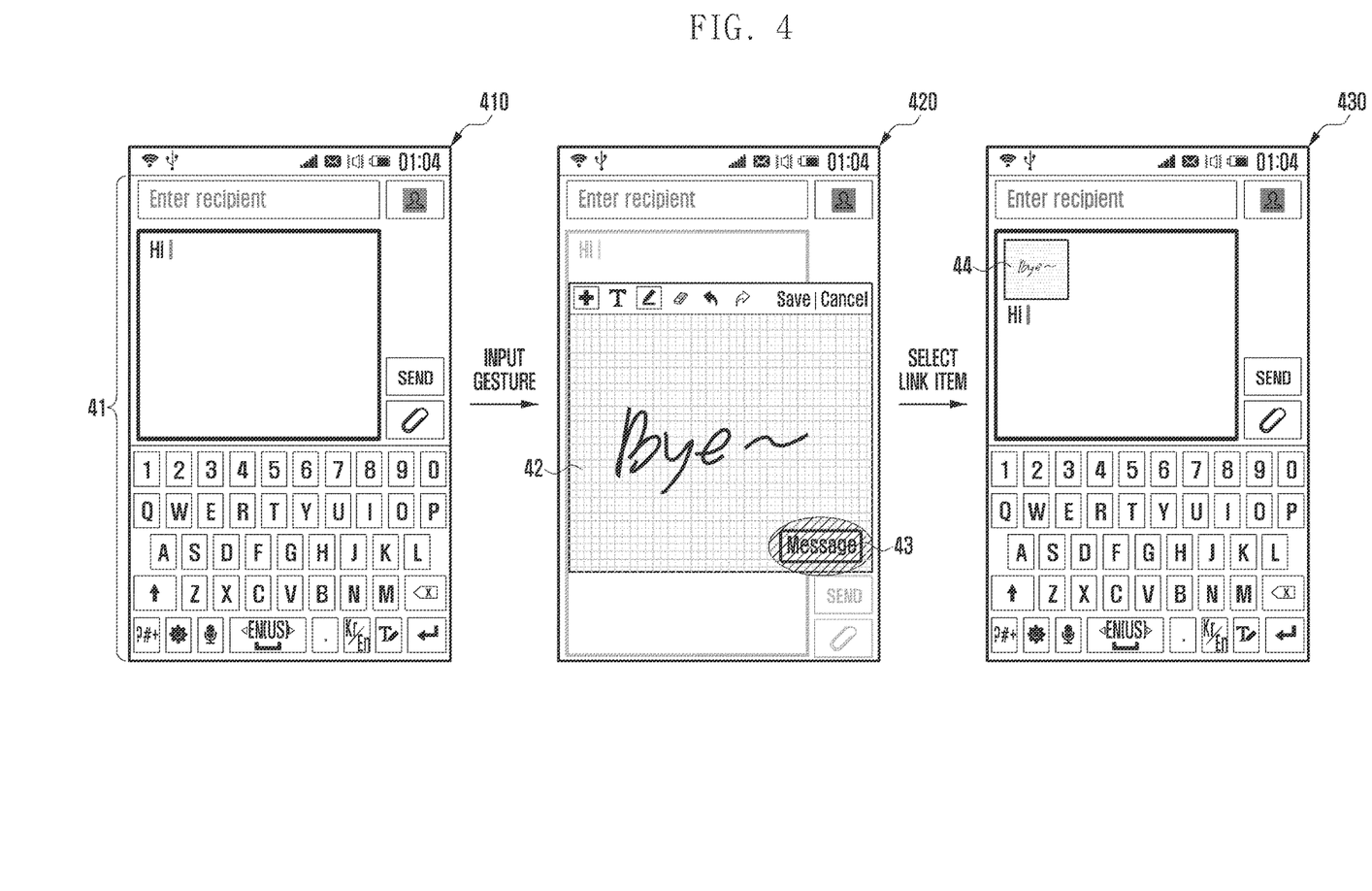
FIG. 4 shows a screen interface illustrating a method for operating an additional function in a mobile device according to an exemplary embodiment of the present invention.

FIG. 4 shows a screen interface illustrating a method for operating an additional function in a mobile device according to an exemplary embodiment of the present invention.

Referring to FIGS. 1 to 4, the control unit 110 may display a text message writing screen 41 on the touch screen 130 as shown in a screenshot 410. When a gesture for requesting an invocation of a memo function is inputted, the control unit 110 may output a memo screen 42 as shown in a screenshot 420. Here, the memo screen 42 may contain a link item 43 that offers a connection with the text message writing screen.

As shown in the screenshot 420, a user may input a memo "Bye" with handwriting on the memo screen 42. At this time, a user may freely input such a memo by using various function icons or buttons of the memo screen 42 (e.g., writing tool selection, color change, eraser, previous (backward), next, save, etc.).

When the link item 43 is selected (e.g., touched), the control unit 110 may terminate a memo function and register the memo input "Bye" in the text message writing screen as shown in a screenshot 430. More specifically, the control unit 110 may capture the memo screen and insert a capture image 44 into the text message writing screen. For this, the control unit 110 may capture the memo screen to have suitable size and volume for transmission of a text message. Alternatively, the control unit 110 may change (or convert) the size of the capture image into other appropriate size.

The inserted capture image 44 may be varied in size by a user. Namely, a user may touch the capture image 44 for a given time or more and drag it to move its position.

Even though the memo screen 42 is displayed in the form of a pop-up window in FIG. 4, this invention is not limited thereto. Alternatively, the memo screen 42 may be displayed in the form of a full screen. Additionally, even though the memo screen 42 contains a single link item in FIG. 4, the memo screen 42 may contain a number of link items. For example, the memo screen 42 may contain a link item for inserting the memo input in the form of an image, a link item for extracting text from the memo input and registering the text in a text message, and the like.

The above-discussed method and apparatus may quickly and easily invoke a specific additional function associated with a running application through an input of a predefined gesture. Also, the method and apparatus may display a link item (e.g., a shortcut icon) for offering a connection with the running application on a part of an execution screen of the additional function. Furthermore, the method and apparatus may dynamically vary a link item displayed on the execution screen of the additional function according to the status of the running application. Therefore, this invention may greatly enhance user's convenience.

The above-discussed exemplary method for operating an additional function in a mobile device may be implemented in the form of a program being readable through a variety of computer means and be recorded in any computer-readable medium. Here, this medium may contain, alone or in combination, program instructions, data files, data structures, and the like. These program instructions recorded in the medium may be specially designed and constructed for exemplary embodiments of the present invention or be well known to persons in the field of computer software. For example, the medium includes hardware devices specially configured to store and execute program instructions, including magnetic media such as a hard disk, a floppy disk and a magnetic tape, optical media such as a Compact Disk Read Only Memory (CD-ROM) and a Digital Video Disk (DVD), magneto-optical media such as a floptical disk, a ROM, a Random Access Memory (RAM), and flash memory. Program instructions may include machine language codes made by a complier and high-level language codes executable in a computer using an interpreter or the like. These hardware devices may be configured to operate as one or more of software to perform the operation of this invention.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for operating an additional function in a mobile device having a touch screen, the method comprising:
    detecting a gesture inputted on the touch screen while a first application is running and is displayed on the touch screen;
    invoking a second application corresponding to the detected gesture among a plurality of gestures;
    connecting the second application to the first application;
    upon the invoking of the second application, displaying an execution screen of the second application including at least one link item for offering data generated by the invoked second application as a portion of data of the first application, the label of the at least one link item included in the execution screen of the second application indicating a type of the first application, and is varied according to the different types of the first application and status of the first application,
    receiving data input and displaying the inputted data on the execution screen of the second application;
    inserting into the first application the data of the inputted second application upon actuation of the at least one link item, the first application being different from the second application and each one of the plurality of gestures corresponds to an application of the mobile device; and
    displaying the inserted data of the second application as part data of the first application.

2. The method of claim 1, further comprising:
    applying, when a signal for selecting the at least one link item is inputted, an execution result of the second application to the first application.

3. The method of claim 1, wherein the invoking of the second application includes identifying the type of the detected gesture, and searching a pre-stored gesture table to determine whether there is a gesture having the identified type.

4. The method of claim 3, wherein the invoking of the second application further includes, if there is no gesture having the identified type, treating the detected gesture as an error.

5. The method of claim 4, wherein the invoking of the second application further includes, if the error occurs more than a predetermined number of times, displaying a list of available gestures.

6. The method of claim 4, wherein the treating of the detected gesture as the error includes outputting at least one of an error message or an error alert sound.

7. An apparatus for operating an additional function in a mobile device, the apparatus comprising:
    a touch screen; and
    at least one processor configured to:
        control the touch screen to detect a gesture inputted on the touch screen while a first application is running and is displayed on the touch screen,
        invoke a second application corresponding to the detected gesture among a plurality of gestures,
        connect the second application to the first application,
        upon the invoking of the second application, display an execution screen of the second application including at least one link item for offering data generated by the invoked second application as a portion of data of the first application, the label of the at least one link item included in the execution screen of the second application indicating a type of the first application, and is varied according to the different types of the first application and status of the first application,
        receive data input and display the inputted data on the execution screen of the second application,
        insert into the first application the data of the second application upon actuation of the at least one link item, the first application being different from the second application and each one of the plurality of gestures corresponds to an application of the mobile device, and
        display the inserted data of the second application as part data of the first application.

8. The apparatus of claim 7, wherein the at least one processor is further configured, when a signal for selecting the at least one link item is inputted, to apply an execution result of the second application to the first application.

9. The apparatus of claim 7, wherein the at least one processor is further configured to:
    identify the type of the detected gesture, and
    search a pre-stored gesture table to determine whether there is a gesture having the identified type.

10. The apparatus of claim 9, wherein the at least one processor is further configured, if there is no gesture having the identified type, to treat the detected gesture as an error.

11. The apparatus of claim 10, wherein the at least one processor is further configured, if the error occurs more than a predetermined number of times, to display a list of available gestures.

12. The apparatus of claim 10, wherein the at least one processor is further configured, if the error occurs, to output at least one of an error message or an error alert sound.

* * * * *